Dec. 27, 1932.  H. N. ANDERSON  1,892,030
APPARATUS FOR MAKING FORGED ARTICLES
Filed Sept. 3, 1929  3 Sheets-Sheet 1
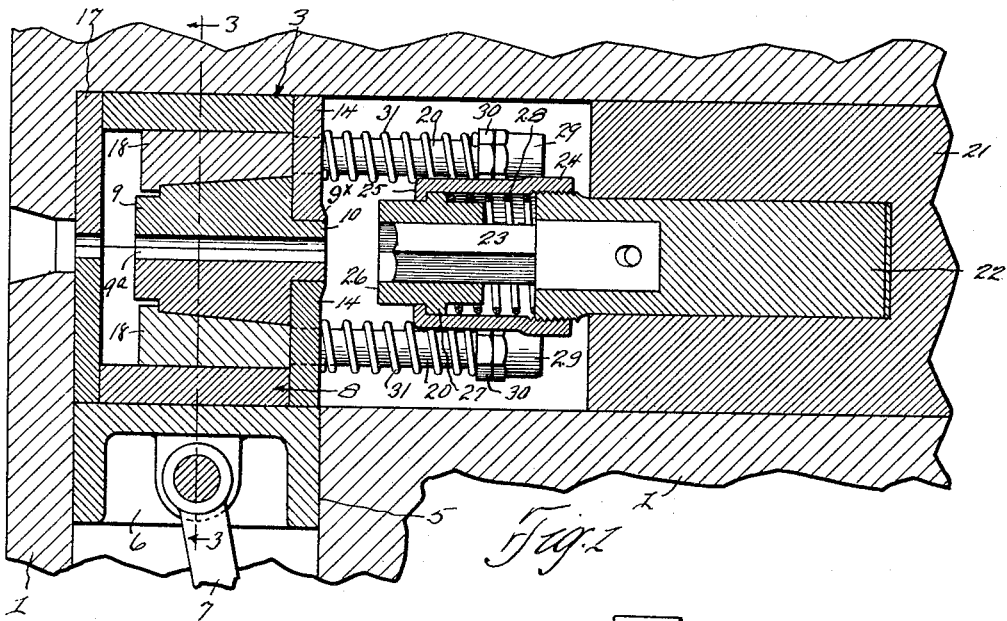
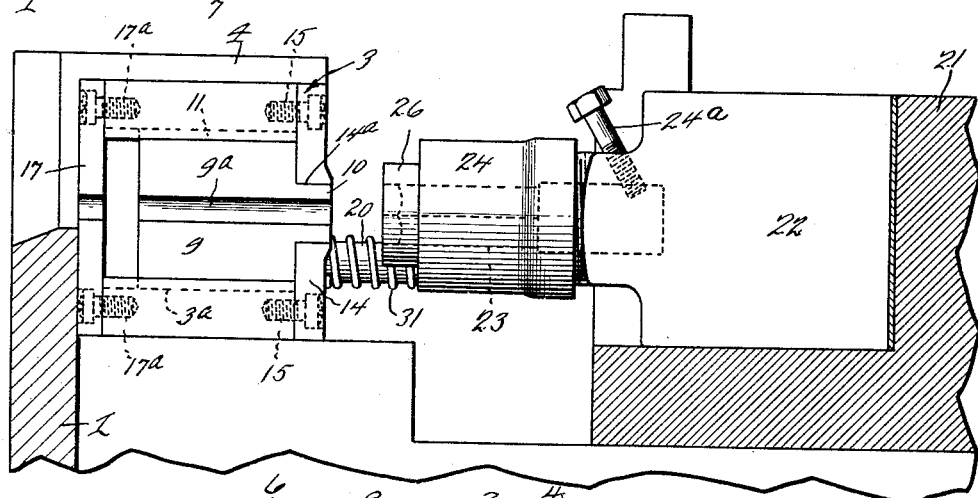
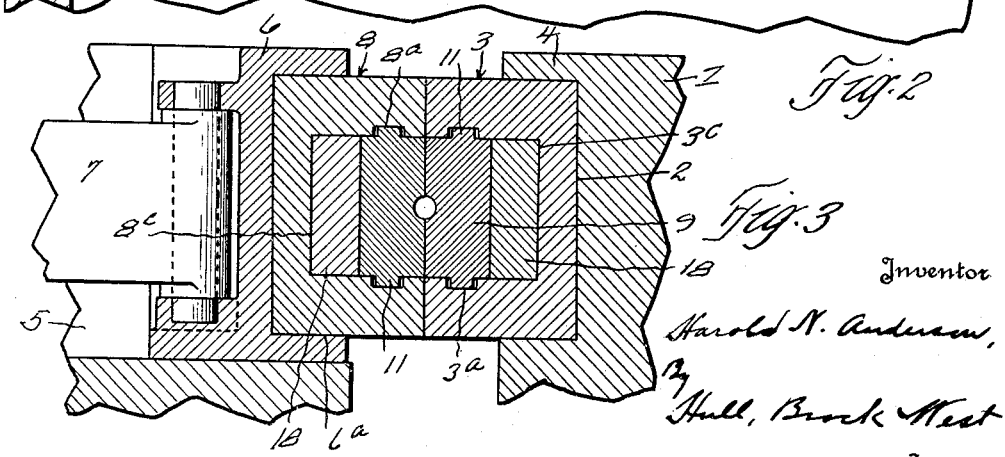

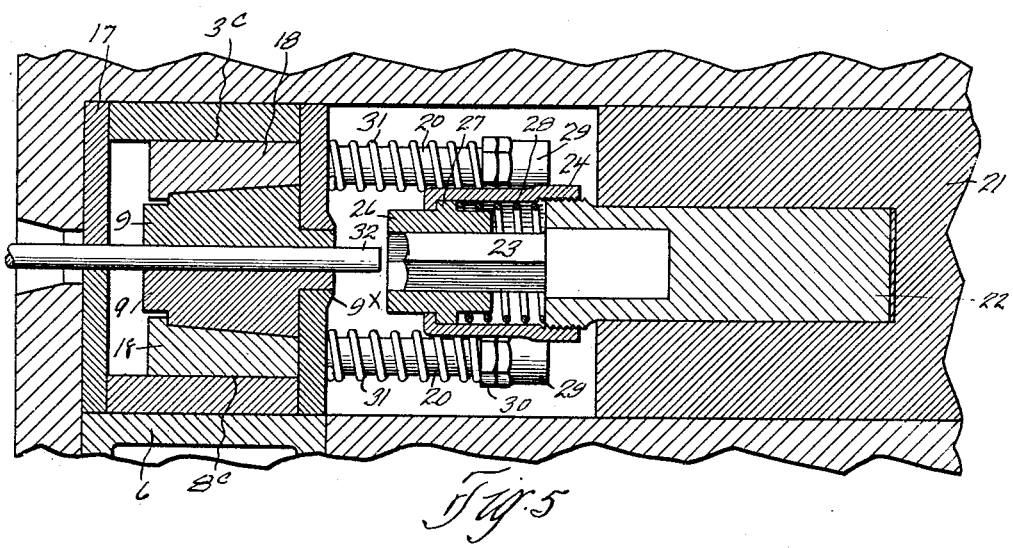
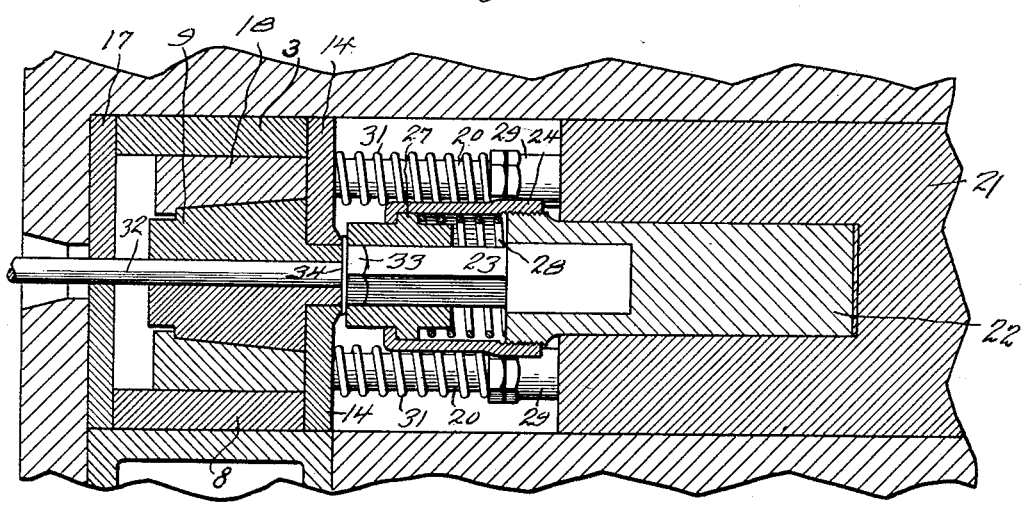
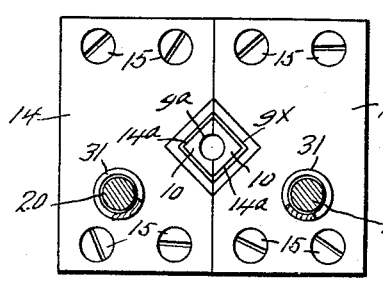

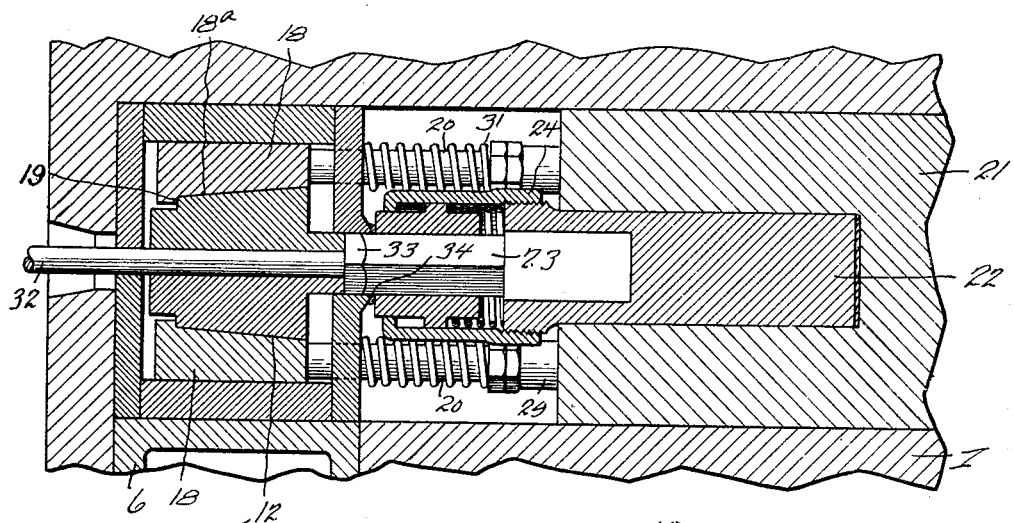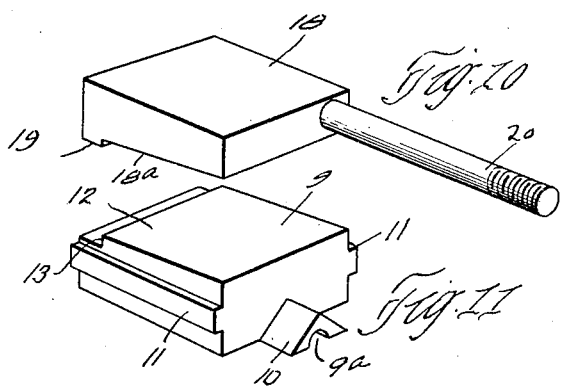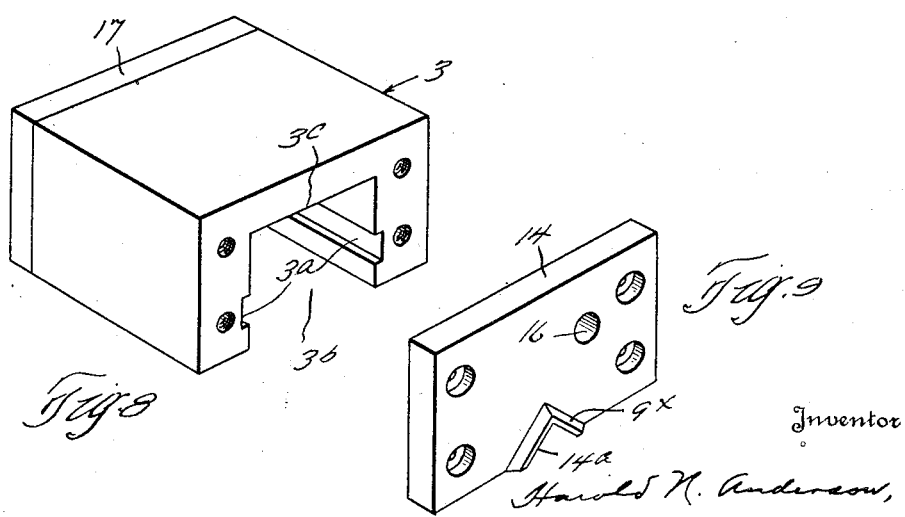

Patented Dec. 27, 1932

1,892,030

UNITED STATES PATENT OFFICE

HAROLD N. ANDERSON, OF LAKEWOOD, OHIO

APPARATUS FOR MAKING FORGED ARTICLES

Application filed September 3, 1929. Serial No. 390,004.

This invention relates to a process of and apparatus for making forged bodies from bars of stock. In the particular embodiment of the invention shown and described in detail herein, the forged bodies are in the forms of heads for what are known to the trade as cap screws or flash bolts, although my invention is not to be limited to the production of such special articles, except as such limitation may be embodied in the claims or rendered necessary by the state of the prior art.

In the manufacture of cap screws or flash bolts, the heads are formed by a single stroke of the die, this stroke leaving not only a flash which has to be subsequently removed, but producing a considerable draft or taper on the head in order to relieve the head from the die.

It is the general object of my invention to enable the end of a bar to be preliminarily shaped, with the production of a head having the usual draft and flash, and to complete the operation of removing the flash and finally shaping the head by a continuous movement of the punch or shaping tool, preferably in the direction of the length of the bar and without the necessity of transferring the stock from one set of dies to another.

I accomplish the foregoing object, as well as other and more limited objects, in and through the process described hereinafter and realized by the apparatus shown in the drawings, wherein Fig. 1 represents a sectional view through a pair of dies and the parts cooperating therewith whereby my invention may be realized; Fig. 2 a central sectional elevation taken at right angles to Fig. 1; Fig. 3 a transverse sectional view corresponding to the line 3—3 of Fig. 1; Fig. 4 a front elevation of the clamping dies; Figs. 5, 6 and 7 are views similar to Fig. 1, but showing the positions of the parts during successive steps in their operation while realizing my process; Fig. 8 a detail in perspective of one of the die members or blocks; Fig. 9 a detail in perspective of one of the front plates secured to and forming part of the dies; Fig. 10 a similar view of one of the wedge blocks forming part of the die; and Fig. 11 a similar view of one of the gripping blocks of the die.

Describing by reference characters the various parts shown in the drawings, 1 denotes part of the bed of an upsetting or forging machine of any approved construction. This bed is shown as provided with a suitable angular notch or recess 2 for the reception of the fixed die 3, said die being shown as secured within the said recess by means of a clamp 4. Reciprocably mounted in a guide 5 in another part of the bed is the movable die holder 6 having an operating arm or connecting rod 7 pivoted thereto, the said holder having a movable die 8 secured within a channeled seat $6^a$ thereof.

The dies 3 and 8 are identical in construction and comprise each a gripping and die block 9 having each a semi-cylindrical bore $9^a$ therethrough. For purposes of description, the right hand of each of the dies 3 and 8 will be referred to as the front end and the opposite end as the rear end. The front end of each block 9 is provided with an inner centrally arranged prismatic projection 10, adapted, when the two blocks are assembled as shown in Fig. 1, to provide a prismatic anvil having the cylindrical bore $9^a$ therethrough, the complete prism being shown as having four sides and the opposite sides being parallel, and preferably all of the sides being of the same length. Each block 9 is provided on opposite sides thereof with a key projection 11, extending the full length thereof, whereby the blocks are slidably mounted in grooves provided respectively therefor at $3^a$ and $8^a$ in the die members 3 and 8. Each of the blocks 9 is provided with a face 12 which tapers toward the rear, being provided at the rear end with a step having a shoulder 13 at right angles to the axis thereof, for a purpose to be described hereinafter. 14 denotes a front plate or trimming die which is secured to each of the dies 3 and 8, each front plate having a prismatic opening $14^a$ therethrough and a forwardly and inwardly tapering projection $9^x$ at the front of such opening, said openings receiving and forming a close fit with the anvil 10 on the blocks 9. The plates 14 are secured to their respective dies by bolts 15 and each is provided with a cylindrical opening 16 therethrough, for a purpose to be described.

Secured to the rear of each die 3 and 8 is a back plate 17, the said plates being secured to the bodies of the dies by bolts 17ª. Each of the dies 3 and 8 is provided with a transverse recess, such as shown at 3ᵇ in Fig. 8, and in the inner or central portion of which a block 9 is slidably mounted by means of its ribs 11 and the grooves 3ª. Each recess 3ᵇ extends above and below the block 9 therein, the top 3ᶜ of the recess in the die 3 and the bottom 8ᶜ of the groove in the die 8 being parallel with the axis of the die. Mounted in the tops and bottoms of the aforesaid recesses respectively are the wedge blocks 18, each having an inwardly presented rearwardly and outwardly tapered face 18ª adapted to slide upon the correspondingly tapered face 12 of the block 9 therewithin; and each wedge block has at its rear end a projection 19 which is adapted to engage the shoulder 13 on the block 9 therewithin. Each block 18 is provided with a push rod 20 extending from one end thereof through the bore 16 provided therefor in the corresponding front plate 14.

21 denotes a head having therein a tool holder 22 in which is mounted the heading punch 23, the said punch being secured in place by a screw 24ª. The operating end of this punch is in the shape of the crown of a four-sided bolt head.

Threaded on the outer end of the tool holder 22 is a collar 24 extending forwardly from the tool holder and having at its front end an inwardly extending annular flange 25. Surrounding the heading punch is a preliminary shaping die 26 the interior whereof is square in cross section and of the same internal dimensions as the external dimensions of the anvil 10 formed jointly on the blocks 9. The shaping die 26 is provided with an external rib 27, the rear face of which is engaged by a strong helical spring 28, the front end of the spring engaging the projecting end of the tool holder.

The front or operating end of each rod 20 has threaded thereon a sleeve 29, there being a washer 30 at the rear of each sleeve. A helical spring 31 surrounds each rod 20 and bears at its rear end against the front plate 14 and at its front end against a washer 30 bearing against a sleeve 29.

With the parts constructed and arranged as described and with the dies 3 and 8 separated, the operation will be as follows: The stock consisting of the bar or rod 32 will be moved to a position such as shown in Fig. 5, with its front end projecting the necessary distance beyond the front plate 14 to enable the head to be formed thereon by the heading punch and the surrounding die member 26. The point to which the end of the bar or rod will be moved will in practice be determined by an ordinary stock gauge. When the bar or rod has been so advanced, as shown in Fig. 5, the connecting rod 7 will be operated to bring the dies 3 and 8 together and to cause the blocks 9 to grip the stock firmly, the wedge blocks 18 at this time being held by the springs 31 in the front reduced ends of their respective tapered guide recesses, behind the gripping die blocks. With the stock thus gripped, the head 21 is moved toward the dies 3 and 8, and the heading punch and the enclosing die 26 operate upon the adjacent front end of the bar or rod 32 to upset such end against the anvil 10 into the head-like form 33 shown in Fig. 6. This operation also produces a flash 34 at the base of the head 3 and between the same and the projections 9ˣ, the shaping movement of the die member 26 being checked through the yielding of the spring 28. At this time, the head 21 will have engaged the forward ends of the sleeve 29, and further movement of the head will result in moving the wedge blocks 18 rearwardly, thereby relaxing the grip of the blocks 9 upon the stock 32. Still further movement of the head 21 in the same direction will result in pushing rearwardly the stock, thus released, as well as the blocks 9, (see Fig. 7) with the result that the flash 34 will be removed by the trimming die formed within the front of the hardened front plate 14, and this trimming die will serve to trim the head 33 to proper final shape, with its sides straight and parallel. The head 21 may then be retracted and the dies 3 and 8 separated, permitting the removal of the headed blank or bolt therefrom and the re-insertion of the bar or stock therebetween. As the head is so retracted, the springs 31 move the wedge blocks 18 toward the reduced or narrowed front ends of their respective guide recesses, thereby moving the gripping blocks 9 into stock-engaging position within their respective dies. This movement of the head 21 also brings back with it the heading punch 23 and the preliminary trimming die 26. The dies 3 and 8 may then be closed and the punch 22 then advanced again to the position shown in Figs. 1 and 5, and the operation repeated.

By virtue of the apparatus shown herein and the mode of operation thereof, I am enabled to produce bodies such as shown herein by a continuous operation, wherein an end of the bar of stock is given a preliminary heading shape, with the production of a flash, the bar being gripped firmly during such operation and wherein, after such operation, the grip upon the bar is released and the flash is removed and the final finished shape given to the head by further movement of the heading punch in the same direction.

Having thus described my invention, what I claim is:

1. In an apparatus of the character described, the combination of a plurality of holding dies each comprising a gripping block, the said blocks being provided jointly with a bore therethrough for the reception of a bar of stock and being provided each with a front plate, the front plates jointly providing a trimming die of appropriate shape surrounding a like-shaped anvil provided on the fronts of the said blocks, means for opening and closing said dies including longitudinally reciprocable wedge blocks, one for each gripping block and adapted by movement toward the front of the die to close said gripping blocks upon a bar of stock, a reciprocable head, a heading punch carried by the said head, a head-shaping die surrounding the said punch, a spring interposed between the head and the head shaping die and yieldingly pressing the latter toward the first mentioned dies, rods extending forwardly from the said wedge blocks, springs surrounding said rods and normally holding them in positions to hold the gripping blocks against the stock, there being adjustable extensions on said rods adapted to be engaged by the head as the latter approaches the dies, thereby to move the wedge blocks rearwardly and permit the gripping blocks to release their hold upon the stock and the punch to force the partly finished head on the bar through the trimming die formed in the front plates.

2. In an apparatus of the character described, the combination of a pair of relatively movable dies, each including a gripping block and a wedge block adapted, when the dies are moved toward each other, to grip a bar of stock therebetween, each gripping block having a projection at the front thereof, the said projections jointly forming an anvil having the external form to be given to a portion of such stock, front plates on said dies through which the said anvil extends and providing a trimming die conforming in internal shape to the external shape of such anvil, a head movable toward and from said dies, a punch carried by said head, a shaping die surrounding said punch, the said die and the end of said punch adapted to impart to an end of the bar projecting in front of such dies an external shape approximating the shape of the anvil, and means operated by the movement of the head toward the dies for moving the wedge blocks thereby to release the action of the gripping blocks upon the stock and enable the stock with the external head thereon to be pressed rearwardly, forcing the head on the stock through the trimming die formed in the said plates, thereby to impart a final external shape to the said head.

3. In an apparatus of the character described, the combination of a pair of relatively movable dies, each comprising a gripping block and adapted, when the dies are closed. to engage and hold a bar of stock, a face plate carried by each of said dies and forming jointly a trimming die at the front of the first mentioned dies, each holding block having a projection fitting within the aperture of its face plate and forming at its front end an anvil, means for holding the said blocks in engagement with a bar of stock when the dies are closed, a head movable toward and from the said dies, a preliminary shaping tool carried by said head and adapted by the movement of the head toward the dies to upset the projecting end of the bar of stock and impart thereto an external form approximating the shape of the projecting end of the anvil, and means operative by further movement of the head toward the said dies for releasing the grip of the said blocks upon the bar whereby the bar and its upset end will be moved rearwardly through the die formed in the face plates thereby to impart to the exterior of such upset portion a final finished shape.

4. In an apparatus of the character described, the combination of a pair of dies, means for closing the said dies thereby to grip a bar of stock with an end portion thereof projecting therebeyond, the said dies having formed in the front thereof a trimming die and provided with an anvil extending through said trimming die, a head, an upsetting tool carried by the said head and adapted to engage the projecting end of the bar and to upset it against such anvil and to impart a predetermined form thereto, means operative by further movement of the head toward the dies for releasing the grip upon the bar and for moving the bar, the anvil, and the upset portion of the bar on said anvil through the trimming die, thereby to impart a final external shape on such upset end.

5. In a device of the character described, a pair of movable gripping dies including cooperating projecting anvil portions, fixed plate means having an opening therethrough to receive said anvil portions and constituting a trimming die, a heading punch, an enclosing head-shaping die surrounding said punch and slidable with respect thereto, and means for automatically releasing said gripping dies after a predetermined movement of said punch and prior to the completion of the operating stroke thereof.

6. In a device of the character described, means for holding a bar of stock, a trimming die surrounding and in fixed relation to said stock when held by said holding means, means including a heading punch and a relatively movable, head-shaping surrounding die through which the punch is movable for upsetting an end of said stock by a definite, predetermined movement to form thereon a head of predetermined general shape, and means whereby a further movement of said heading punch renders inactive said holding means and forces said head through said trimming die for imparting thereto a different shape.

In testimony whereof, I hereunto affix my signature.

HAROLD N. ANDERSON.